United States Patent [19]

Barbieri

[11] Patent Number: 4,991,781
[45] Date of Patent: Feb. 12, 1991

[54] MACHINE FOR SPREADING FERTILIZERS, SEEDS, SALT, AND THE LIKE

[75] Inventor: Silvano Barbieri, Curtarolo, Italy

[73] Assignee: B. S. Barbieri di Barbieri Silvano, Curtarolo, Italy

[21] Appl. No.: 362,784

[22] Filed: Jun. 7, 1989

[30] Foreign Application Priority Data

Jun. 23, 1988 [IT] Italy .................. 30676/88[U]

[51] Int. Cl.⁵ .................. A01C 17/00; A01C 15/00
[52] U.S. Cl. ............................ 239/661; 239/681
[58] Field of Search ......... 239/650, 661, 670, 681, 239/684

[56] References Cited

U.S. PATENT DOCUMENTS

| | | | |
|---|---|---|---|
| 2,547,143 | 4/1951 | Speicher | 239/661 |
| 4,175,705 | 11/1979 | Dreyer | 239/661 X |
| 4,179,073 | 12/1979 | Oosterling et al. | 239/661 X |
| 4,609,153 | 9/1986 | Van der Lely | 239 X/587 |

FOREIGN PATENT DOCUMENTS

| | | |
|---|---|---|
| 3703613 | 8/1988 | Fed. Rep. of Germany . |
| 1373590 | 8/1964 | France . |
| 6408721 | 7/1964 | Netherlands . |
| 1147886 | 4/1969 | United Kingdom . |

Primary Examiner—Michael S. Huppert
Assistant Examiner—Kevin P. Weldon

[57] ABSTRACT

The machine comprises a hopper supported on a frame, having a horizontal portion supporting a centrifugal spreader below the hopper and an upright portion, upwardly supporting a U-shaped element and laterally supporting wings. The U-shaped element is connected to the hopper and the wings are rigidly associated with upwardly inclined arms which are in turn externally connected to the hopper at diametrically opposite points defined thereon. A pre-mixer is arranged inside the hopper, and a reinforcement element is located above the pre-mixer inside the hopper. The reinforcement element is rigidly associated with end plates which are connected to the diametrically opposite points at the inside of the hopper.

13 Claims, 2 Drawing Sheets

MACHINE FOR SPREADING FERTILIZERS, SEEDS, SALT, AND THE LIKE

BACKGROUND OF THE INVENTION

The present invention relates to a machine for spreading fertilizers, seeds, salt, sand etc.

Various kinds of machines for spreading the above mentioned materials are already known, including machines of the type comprising a hopper which feeds a centrifugal bladed spreader, adapted for rotation in a horizontal plane.

Machines of this kind are usually connected to the three-point coupling of a tractor and power for driving the spreader is derived from the tractor's power take-off or auxiliary drive shaft.

The hoppers of such machines are supported by frames from which they can be disassembled for storage or for transport.

However, while such machines are satisfactory in some aspects, they are not devoid of inconveniences, not least of which is the fact that the structures of said frames even when disassembled, are nonetheless extremely bulky and therefore scarcely practical, and create significant problems regarding their transport and storage.

Another inconvenience encountered in the use of the known types of machines resides in the fact that the frames often lack strength when disassembled from the hopper and cannot be stacked with other similar frames for storage and/or transport purposes.

A further disadvantage encountered in the known types of machines is the fact that the frames often interfere with the ejection areas of the centrifugal spreader causing uneven spreading and/or a reduced effective operating range, with an inherent reduction in operating efficiency.

SUMMARY OF THE INVENTION

Accordingly, an aim of the present invention is to provide a machine for spreading fertilizers, seeds, salt, sand and the like, having a frame which can be disassembled from the hopper so as to occupy a reduced storage space and a minimal volume for transport.

Within the above aim, an object of the invention is to provide a machine having a supporting frame which is extremely strong and which can be stacked with others for storage and transport purposes.

Another important object of the invention is to provide a machine structure which is capable of spreading fertilizers, seeds etc. with a considerable spreading range without the frame interfering with the ejection areas.

A further object of the invention is to provide a machine structure characterized by great overall strength, avoiding any collapse of the hopper.

Still another object of the invention is to provide a simple machine which achieves high work yields.

A not least object of the invention is to have low costs obtainable with conventional production systems.

This aim, these objects and others which will become apparent hereinafter are achieved by a machine for spreading fertilizers, seeds, salt, sand and the like, comprising a hopper which feeds a centrifugal bladed spreader adapted for rotation in a substantially horizontal plane, characterized in that it comprises a substantially chair-shaped supporting frame fixed to said hopper at an upper portion thereof and at least two arms extending from said frame and being coupled to diametrically opposite points of said hopper, at least one diametrical stiffening element being fixed inside said hopper between said diametrically opposite points.

BRIEF DESCRIPTION OF THE DRAWINGS

Further characteristics and advantages of the invention will become apparent from the detailed description of an embodiment of the invention, illustrated only by way of nonlimitative example in the accompanying drawings, wherein.

DESCRIPTION OF THE PREFERRED EMBODIMENTS

Figure 2:
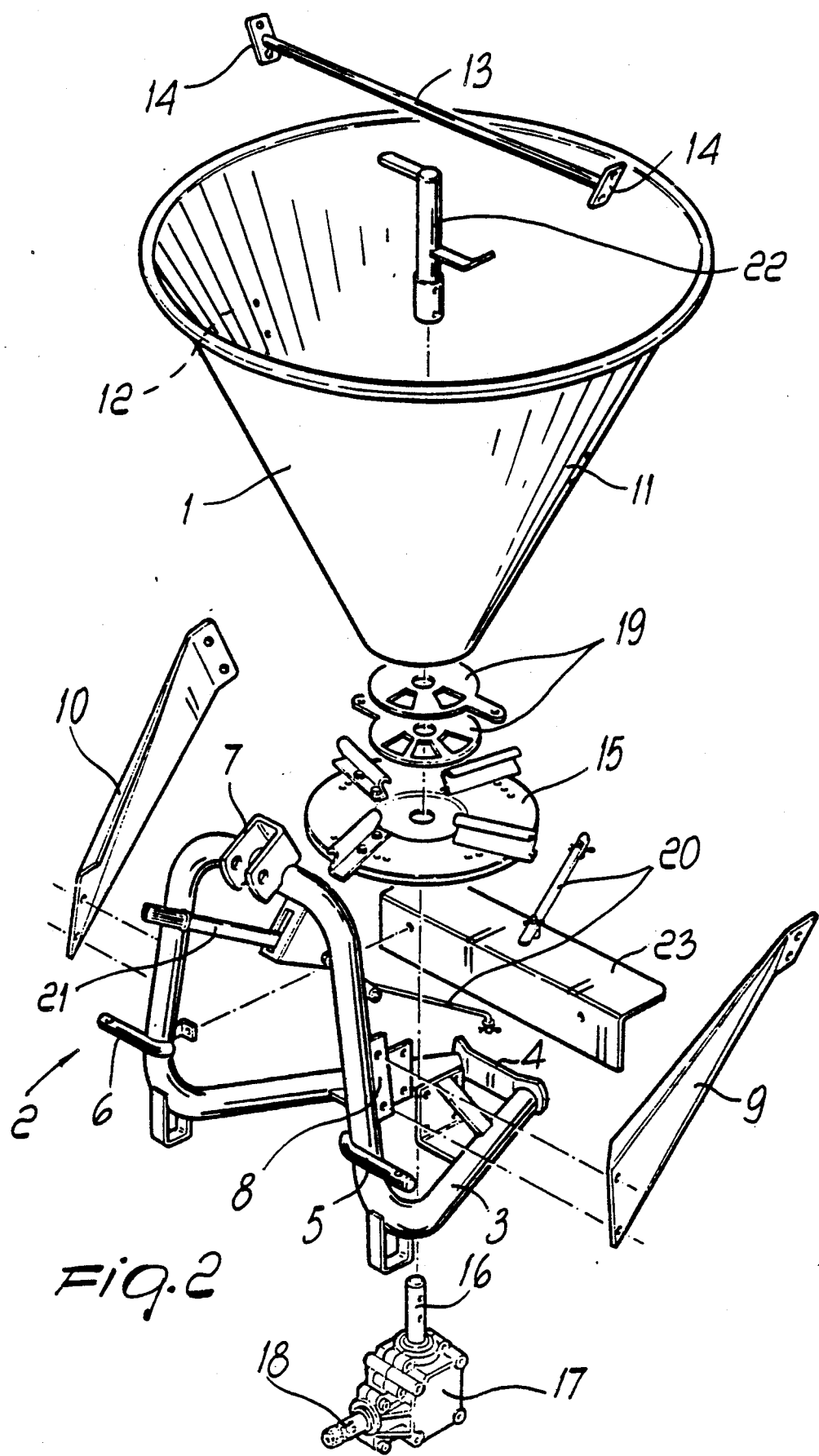
FIG. 2 is an exploded perspective view of the structure of FIG. 1.
Figure 1:
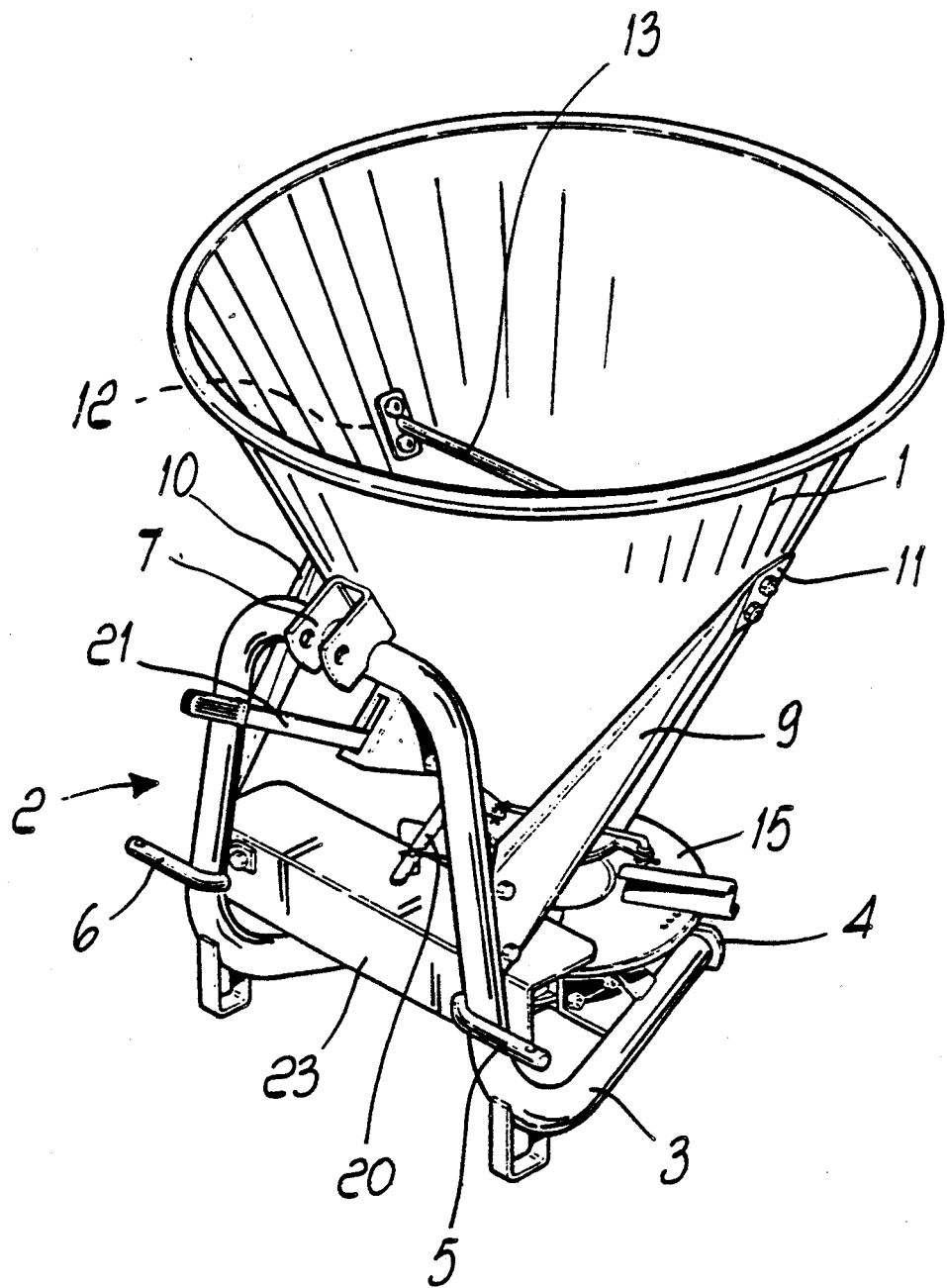
FIG. 1 is a perspective view of the machine structure according to the invention.

With reference to the above described figures, the machine structure according to the invention comprises a hopper 1 which is substantially constituted by an inverted truncated cone mounted on a frame 2 which, according to the invention, is substantially chair-shaped or L-shaped and is expediently made of a tubular element 3 folded and shaped so as to define two planes which are substantially orthogonal to one another.

More precisely, one upright portion of the frame 2 lies in a substantially vertical plane and defines an inverted U-like shape having downwardly extending branches, and from each of the branches there extends in an essentially perpendicular direction with respect to said vertical plane, a support member.

The ends of said tubular element 3 defined by the free ends of the support members are arranged on a substantially horizontal plane and are rigidly associated, e.g., welded, to a single joining plate 4.

As indicated in the above described figures, said frame 2 is downwardly provided with two pins, indicated respectively by the reference numerals 5 and 6, rigidly associated with the upright portion of the frame lying in said substantially vertical plane, and is upwardly provided with a substantially U-shaped coupling element 7 having axially aligned holes formed therein in order to associate the frame 2 with the three-point coupling of a tractor.

An upper portion of said hopper 1 is advantageously releasably fixed, e.g., by being bolted, to said U-shaped coupling element 7, thus defining a strong coupling point for said hopper.

Wings 8 are welded or otherwise rigidly associated with the sides of said frame 2, defined by the downwardly extending branches of the inverted U-shaped element, above the pins 5 and 6. Supporting arms, indicated respectively by the reference numerals 9 and 10, advantageously made of a pressed steel, are rigidly connected, e.g., through bolts, to said wings 8.

The two supporting arms 9 and 10 are expediently inclined upwards and are rigidly associated through fixing means such as bolts, at the ends opposite to said frame 2, with diametrically opposite points 11 and 12 of said hopper 1, and thus complete said hopper's supporting structure.

A stiffening element 13 is fixed, e.g., by bolting, between the diametrically opposite internal points of said hopper 1 and may be constituted by a reinforcement member such as a metal tube welded or otherwise connected to end plates 14.

Advantageously, common fixing means, such as bolts located at through-holes formed at said diametrically points 11, 12 of said hopper 1, may be used for contemporaneously connecting both the ends of the upwardly inclined arms 9, 10, and the end plates 14 of the stiffening element 13 to said hopper 1.

A known centrifugal bladed spreader 15 is arranged on the substantially horizontal portion of said frame 2 below said hopper 1 and is rigidly associated with a shaft 16 of an angle joint 17 the opposite shaft 18 whereof is connected to the tractor's power take-off.

Said spreader 15 rotates on a substantially horizontal plane and is fed by said hopper through a double shutter 19 the opening whereof can be adjusted by means of lever mechanisms 20 having an actuation rod 21 pivotally connected to said frame 2.

A pre-mixer 22, having a plurality of blades, is axially coupled to said centrifugal spreader 15 and extends axially inside the hopper 1.

A housing 23, which may be made for instance of L-shaped sheet metal is rigidly connected to the substantially vertical part of the frame 2, e.g., by being bolted thereto.

According to the invention, the particular constructive configuration of said frame 2 provides an extensive range of ejection for the spreader 15, with no blind spots.

Thus, the hopper 1 is connected to the frame 2 at three main points, defined by the U-shaped element 7 and the connection points of the upwardly inclined arms 8, 9, and is even further strengthened by the presence of the stiffening element 13, the end plates 14 whereof are connected to the same diametrically opposite points 11,12 of the hopper as the ends of the arms 9,10 located remote from the wings 8.

The external three-point support of the hopper 1, combined with the presence of the internal stiffening element 13, gives the assembly extreme strength and rigidity which effectively overcomes the hopper's tendency to become oval and collapse when it is filled with material, with consequent detrimental effects both on the hopper itself and on all of the mechanisms arranged below it.

An equally important characteristic of the invention resides in the fact that the particular shape of the frame gives it high strength and allows a rapid disassembly, with consequent reduced storage and transport space.

From what has been described and illustrated it is therefore apparent that all the intended aims and objects have been achieved.

The invention thus conceived is susceptible to modifications and variations; thus, for example, in another embodiment the two supporting arms 9 and 10 may be stably coupled between the frame 2 and the hopper 1, for example by welding, and equally perform their primary function.

In practice, the materials employed, as well as the dimensions, may be any according to the requirements.

I claim:

1. Machine for spreading fertilizers, seeds, salt, sand and the like, comprising a hopper means which feeds a rotating centrifugal bladed spreader means and a substantially chair-shaped supporting frame means supporting said hopper means and being connectable to a three-point coupling means of a tractor means, said supporting frame means comprising a first supporting arm means and a second supporting arm means, said first supporting arm means being connected at one end thereof with said supporting frame means and being connected at another end thereof externally with said hopper means at a first connection point thereof, said second supporting arm means being connected at one end thereof with said supporting frame means and being connected at another end thereof externally with said hopper means at a second connection point thereof, said first connection point and said second connection point being a pair of diametrically opposite connection points arranged on said hopper means, said machine further comprising a stiffening element means, said stiffening element means internally spanning said hopper means and having a first end being connected to said hopper means internally thereof at said first connection point and having a second end being connected to said hopper means internally thereof at said second connection point.

2. Machine according to claim 1, wherein first through hole means are provided at said first connection point of said hopper means and second through hole means are provided at said second connection point of said hopper means, said other end of said first supporting arm means and said first end of said stiffening element means being simultaneously removably connected to said hopper means at said first connection point by means of first fixing bolt means, said other end of said second supporting arm means and said second end of said stiffening element means being simultaneously removably connected to said hopper means at said second connection point by means of second fixing bolt means.

3. Machine according to claim 1, wherein said supporting frame means is shaped so as to define a first plane and a second plane, said first and second planes being substantially mutually orthogonal, said supporting frame means comprising a substantially u-shaped portion lying in said first plane and having two downwardly extending branches, said supporting frame means further comprising two support member lying in said second plane, each one of said support members extending from a respective one of said extending branches, said two support members of said supporting frame means supporting said rotating centrifugal bladed spreader means.

4. Machine according to claim 3, wherein said supporting frame means further comprise pin means being rigidly associated with a lower portion of each one of said downwardly extending branches and a substantially u-shaped coupling element rigidly associated with an upper portion of said u-shaped portion of said supporting frame means, said pin means and said u-shaped coupling element being arranged in said first plane defined by said supporting frame means, said pin means and said u-shaped coupling element being adapted to connect to a three-point coupling means of a tractor means, said u-shaped coupling element supporting an upper portion of said hopper means.

5. Machine according to claim 3, wherein said supporting frame means is constituted by a folded tubular element.

6. Machine according to claim 3, further comprising a joining plate means and a housing means, said joining plate means being mutually connected to said two support members at respective free ends thereof, said housing means being mutually connected to said downwardly extending branches.

7. Machine according to claim 3, further comprising a first wing and a second wing, said first wing and said second wing being welded on a respective one of said downwardly extending branches, said first supporting arm means being removably connected at one end thereof to said first wing by means of third bolt means, said second supporting arm means being removably connected at one end thereof to said second wing means by means of fourth bolt means.

8. Machine according to claim 1, wherein said first and said second supporting arm means are defined by a pressed metal structure.

9. Machine according to claim 1, wherein said supporting frame means is shaped so as to define a first plane and a second plane, said first and second planes being substantially mutually orthogonal, said supporting frame means comprising a substantially u-shaped portion lying in said first plane and having two downwardly extending branches, said supporting frame means further comprising two support members lying in said second plane, each one of said support members extending from a respective one of said extending branches, said two support members of said supporting frame means supporting said rotating centrifugal bladed spreader means, said first supporting arm means being welded at one end thereof to one of said extending branches of said supporting frame means and said second supporting arm means being welded at one end thereof to another of said extending branches of said supporting frame means, said first supporting arm means being welded at another end thereof to said first connection point of said hopper means and said second supporting arm means being welded at another end thereof to said second connection point of said hopper means.

10. Machine according to claim 1, wherein first through hole means are provided at said first connection point of said hopper means and second through hole means are provided at said second connection point of said hopper means, said stiffening element means being constituted by a tube means having a first end plate means welded at a first tube means end thereof and a second end plate means welded at a second tube means end thereof, said other end of said first supporting arm means and said first end plate means of said tube means being simultaneously removably connected to said hopper means at said first connection point by means of first fixing bolt means, said other end of said second supporting arm means and said second end plate means of said tube means being simultaneously removably connected to said hopper means at said second connection point by means of second fixing bolt means.

11. Machine according to claim 1, wherein said supporting frame means is shaped so as to define a first plane and a second plane, said first and second planes being substantially mutually orthogonal, said supporting frame means comprising a substantially u-shaped portion lying in said first plane and having two downwardly extending branches, said supporting frame means further comprising two support members lying in said second plane, each one of said support members extending from a respective one of said extending branches, said two support members of said supporting frame means supporting said rotating centrifugal bladed spreader means, said hopper means being substantially supported on three points defined by said other end of said first supporting arm means, by said other end of said second supporting arm means, and by said u-shaped coupling element, said stiffening element means being connected between two of said three points which are arranged diametrically opposite.

12. Machine for spreading fertilizers, seeds, salt, sand and the like, comprising a hopper means which feeds a rotating centrifugal bladed spreader means and a substantially chair-shaped supporting frame means supporting said hopper means and being connectable to a three-point coupling means of a tractor means, said supporting frame means comprising a first supporting arm means and a second supporting arm means, said first supporting arm means being connected at one end thereof with said supporting frame means and being connected at another end thereof externally with said hopper means at a first connection point thereof, said second supporting arm means being connected at one end thereof with said supporting frame means and being connected at another end thereof externally with said hopper means at a second connection point thereof, said first connection point and said second connection point being a pair of diametrically opposite connection points arranged on said hopper means, said machine further comprising a stiffening element means, said stiffening element means internally spanning said hopper means and having a first end being connected to said hopper means internally thereof at said first connection point and having a second end being connected to said hopper means internally thereof at said second connection point, first through hole means being provided at said first connection point of said hopper means and second through hole means being provided at said second connection point of said hopper means, said other end of said first supporting arm means and said first end of said stiffening element means being simultaneously removably connected to said hopper means at said first connection point by means of first fixing bolt means, said other end of said second supporting arm means and said second end of said stiffening element means being simultaneously removably connected to said hopper means at said second connection point by means of second fixing bolt means.

13. Machine for spreading fertilizers, seeds, salt, sand the like, comprising a hopper means which feeds a rotating centrifugal bladed spreader means and a substantially chair-shaped supporting frame means supporting said hopper means and being connectable to a three-point coupling means of a tractor means, said supporting frame means comprising a first supporting arm means and a second supporting arm means, said first supporting arm means being connected at one end thereof with said supporting frame means and being connected at another end thereof externally with said hopper means at a first connection point thereof, said second supporting arm means being connected at one end thereof with said supporting frame means and being connected at another end thereof externally with said hopper means at a second connection point thereof, said first connection point and said second connection point being a pair of diametrically opposite connection points arranged on said hopper means, said machine further comprising a stiffening element means, said stiffening element means internally spanning said hopper means and having a first end being connected to said hopper means internally thereof at said first connection point and having a second end being connected to said hopper means internally thereof at said second connection point, said supporting frame means being shaped so as to define a first plane and a second plane, said first and second planes being substantially mutually orthogonal, said supporting frame means comprising a substantially u-shaped portion lying in said first plane and having two downwardly extending branches, said supporting frame means further comprising two support members lying in said second plane, each one of said support members extending from a respective one of said extending branches, said two support members of said supporting frame means supporting said rotating centrifugal bladed spreader means, said hopper means being substantially supported on three points defined by said other end of said first supporting arm means, by said other end of said second supporting arm means, and by said u-shaped coupling element, said stiffening element means being connected between two of said three points which are arranged diametrically opposite.

* * * * *